United States Patent
Takahama

[15] 3,649,110
[45] Mar. 14, 1972

[54] PROJECTION LAMP DE-ENERGIZING DEVICE

[72] Inventor: Sho Takahama, Hyogo, Japan
[73] Assignee: Fuji Photo Film Co., Ltd., Kanagawa, Japan
[22] Filed: Feb. 10, 1970
[21] Appl. No.: 10,175

[30] Foreign Application Priority Data
May 2, 1969 Japan....................................44/34294

[52] U.S. Cl..............................352/92, 335/13, 352/155, 352/178
[51] Int. Cl........................................................G03b 21/50
[58] Field of Search.....................352/92, 155, 178; 335/13

[56] References Cited
UNITED STATES PATENTS
2,011,272  8/1935  Duggan............................352/92 X
3,238,008  3/1966  Krumbein........................352/178 X FOREIGN PATENTS OR APPLICATIONS
169,976  12/1922  Great Britain........................352/92

*Primary Examiner*—S. Clement Swisher
*Assistant Examiner*—Denis E. Corr
*Attorney*—Sughrue, Rothwell, Mion, Zinn & Macpeak

[57] ABSTRACT

A manually operated switch which energizes the projection lamp, is mechanically latched in lamp energized position by a pivotable lever which is spring biased into latched position but is unlatched by a solenoid electrically coupled to a microswitch which senses a notch within the edge of a motion picture film or the lack of presence of the same, to de-energize the projection lamp automatically by unlatching the manually operable switch.

4 Claims, 4 Drawing Figures

Patented March 14, 1972
3,649,110
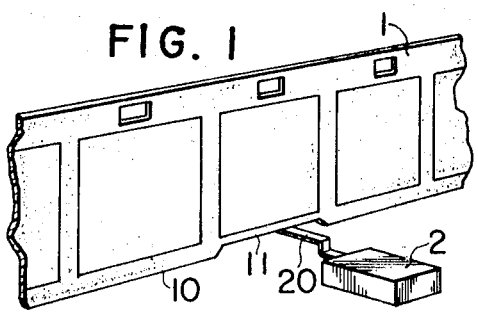
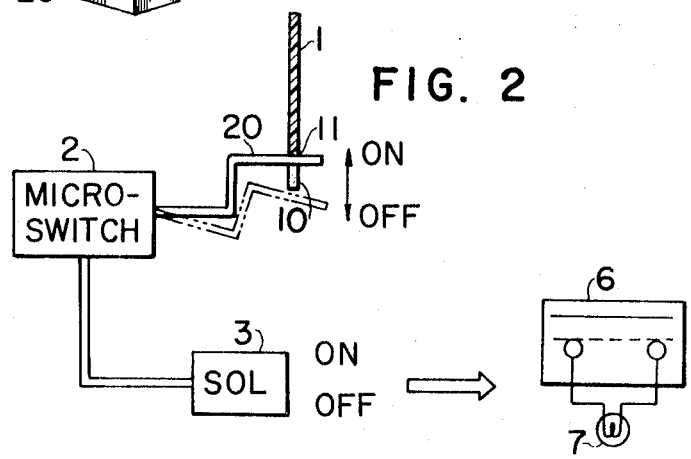
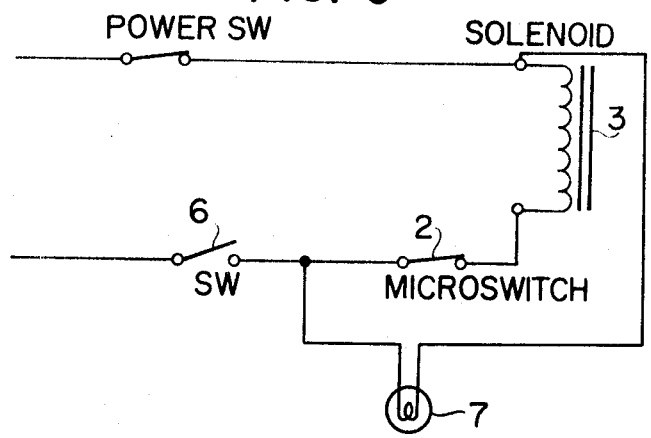
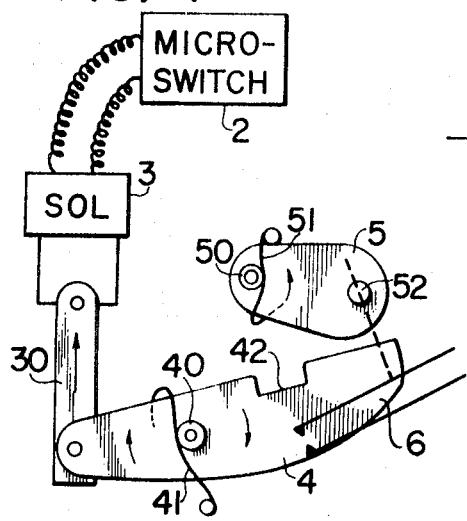
INVENTOR
SHO TAKAHAMA
BY Sughrue, Rothwell, Mion, Zinn & Macpeak
ATTORNEYS

PROJECTION LAMP DE-ENERGIZING DEVICE

BACKGROUND OF THE INVENTION

1. Field of the Invention

The present invention relates to a projection lamp de-energizing device for a motion picture projector, and in particular to a device for automatically turning off the projection lamp when the need for the projection lamp ceases.

2. Description of the Prior Art

In a motion picture projector, if the lamp is on when the film is stopped, the film is damaged by heat and the life of the lamp is shortened. It also shortens the life of the lamp to turn it on and it is a waste of the lamp when film is not loaded into the projector. The waste usage of the projection lamp shortens not only the life of the projection lens, but also a prism in those projectors using a prism for projection.

It is, therefore, desirable to prevent the projection lamp from being energized when the film is stopped or is not loaded in the projector.

SUMMARY OF THE INVENTION

A microswitch is provided to sense one edge of the film. When the microswitch senses a notch in the film or when the film is not loaded in the projector, the microswitch actuates to turn off the projection lamp. The lamp switch is actuated manually and the switch is held in its turning-on position by means of a latch. The latching means is released when the microswitch is actuated. Once the projection lamp is turned off, the lamp will not be turned on until the operator reactuates the switch manually.

The above de-energizing of the projection lamp is carried out automatically when the film stops at the end of its projection or when it is not loaded in the projector.

The principal object of the present invention is to provide a device for automatically turning off the projection lamp when the film is stopped or when it is not loaded in the projector.

Another object of the present invention is to provide a device for automatically turning off the projection lamp and for preventing the projection lamp from being turned on until it is turned on manually.

BRIEF DESCRIPTION OF THE DRAWINGS

FIG. 1 is a fragmentary perspective view of the film and the microswitch employed in the device in accordance with the present invention.

FIG. 2 is a diagrammatic view simply illustrating the complete operation of the device in accordance with the present invention.

FIG. 3 is a diagram of the circuit connections of one example of a portion of the electric circuit employed in the device in accordance with the present invention, and FIG. 4 is a plan view showing an embodiment of the mechanism employed at the switching portion in relation with the present invention.

DESCRIPTION OF THE PREFERRED EMBODIMENT

Referring to FIG. 1, a microswitch 2 having an actuator 20 is so provided as to sense the edge 10 of the motion picture film 1. The film 1 has a notch 11 at the edge position of the film where the film should be stopped. The microswitch is in its off state when the film is projected in its ordinary position, and is in its on state when the film is not loaded in the projector or the notch 11 of the film 1 is brought into engagement with the actuator 20 of the microswitch 2, as shown in FIG. 2. The microswitch 2 is connected to a solenoid 3 so that the solenoid 3 is actuated when the microswitch 2 is closed, that is "on."

As shown in FIG. 4, the solenoid 3 is mechanically connected to an end of a lever 4, which is pivotally mounted to an axle 40, through an interlocking member 30. The lever 4 is urged to rotate in the counterclockwise direction by a spring 41. The lever 4 is provided with a cut out portion 42 on the upper right edge as shown in FIG. 4, to be engaged with a latch pin 52 fixed on a manually operated lever 5. The lever 5 is pivotally mounted on an axle 50 and urged to rotate in the counterclockwise direction by a spring 51. When the lever 5 is rotated in the clockwise direction manually against the force of the spring 51, the pin 52 fixed to the lever 5 is brought into engagement with the cut out portion 42 provided on the lever 4 which is biased counterclockwise. After the pin 52 is brought into engagement with the cut out portion 42, the lever 5 is retained in its position by engagement with the lever 4. The manually operated lever 5 is connected to a switch 6 of the projection lamp 7 so that the switch 6 is closed when the lever 5 is manually rotated in the clockwise direction. Therefore, by rotating the lever 5 clockwise, the projection lamp 7 is turned on and kept on, since the lever 5 is held in the rotated position.

If the lever 4 rotates clockwise while the lever 5 is engaged with the lever 4, the lever 5 rotates counterclockwise by itself under bias of the spring 51 and the switch 6 of the projection lamp 7 opens and the lamp 7 is turned off.

In accordance with the device constructed as above, when the film is not loaded in the projector or when the notched portion 11 of the film 1 is brought into engagement with the actuator 20 of the microswitch 2, the actuator 20 of the microswitch 2 is moved up and the microswitch 2 is closed. When the microswitch 2 is closed, the solenoid 3 connected thereto is operated to pull the lever 4 resulting in the clockwise rotation of the lever 4. In response to the clockwise rotation of the lever 4, the lever 5 is released and rotated counterclockwise. When the lever 5 is rotated the switch 6 of the projection lamp 7 is opened and the lamp 7 is turned off. Thus, the waste of projection lamp light is prevented.

In order to prevent an occurrence where the projection lamp 7 will not be turned on even if the operating switch is turned on again after the lamp is once turned off by the device in accordance with the present invention, switch 6 may be provided in series with the microswitch 2 as shown in FIG. 3 so that switch 6 is opened indirectly by the energization of the solenoid 3. That is, once the solenoid 3 operates, the solenoid 3 cannot be re-energized until the switch 6 is closed by some separate means. By connecting the switch 6 with the manually operated lever 5, the lamp 7 is turned on if the lever 5 is rotated clockwise after the projection once stops.

With the device for automatically turning off the projection lamp in accordance with the present invention constructed as described above, the projection lamp is automatically turned off when the film is stopped in response to the appearance of the stop-indicating notch on the film. And when the film is not loaded in the projector, the projection lamp can not be turned on. Thus, the life of the projection lamp can be extended.

What is claimed is:

1. A device for de-energizing a projection lamp energized by a manually operated projection lamp switch comprising: a microswitch having an actuator contacting the edge of the projector motion picture film for closing said microswitch in the absence of contact with said film edge, when contacting a notch therein, whereby film projection is stopped, a solenoid electrically connected to said microswitch, a first lever operatively associated with said projection lamp switch for manually turning on said projection lamp, means biasing said first lever to projection lamp switch off position, latch means for holding said first lever in lamp energizing position, and means responsive to energization of said solenoid for releasing said latch means, whereby; the projection lamp is turned off when the film is stopped due to the presence of said notch, or is unloaded from said projector.

2. A device for de-energizing a projection lamp as defined in claim 1, wherein said first lever has a pin fixed thereto, said latch means includes a second lever connected with said solenoid and having a cut out to receive said pin, whereby, when said first lever is rotated manually toward said second lever said first lever pin is brought into latch engagement with said second lever, and when said second lever is rotated by said solenoid away from said first lever, said first lever is disengaged from said second lever, thereby turning-off said projection lamp.

3. The device for de-energizing a projection lamp as defined in claim 2, wherein said manually operated switch is connected in series with said microswitch, whereby said manually operated switch is opened by energization of said solenoid and release of said latch means, said solenoid being actuated by closing of said microswitch in response to sensing a notch within the edge of said film.

4. The device for de-energizing a projection lamp as defined in claim 1 wherein said manually operated switch is connected in series with said microswitch, whereby said manually operated switch is opened by said solenoid by release of said latch with the solenoid being actuated by turning-on of said microswitch in response to sensing a notch within the edge of said film.

* * * * *